United States Patent [19]
Sugawara et al.

[11] Patent Number: 5,788,297
[45] Date of Patent: Aug. 4, 1998

[54] RESIN-MADE SHOCK ABSORBING MEMBER FOR A VEHICLE AND METHOD FOR PRODUCING THE SAME

[75] Inventors: Minoru Sugawara; Tetsuya Nakamura; Katsuhiko Tada, all of Ichihara; Hiroshi Takai, Okazaki; Hiroshi Jounishi, Toyota; Yoshihide Endou, Toyota; Ken Fukuda, Toyota, all of Japan

[73] Assignees: Idemitsu Petrochemical Co., Ltd., Tokyo; Toyota Jidosha Kabushiki Kaisha, Aichi-ken, both of Japan

[21] Appl. No.: 628,629

[22] PCT Filed: Aug. 10, 1995

[86] PCT No.: PCT/JP95/01590

§ 371 Date: Jul. 1, 1996

§ 102(e) Date: Jul. 1, 1996

[87] PCT Pub. No.: WO96/05044

PCT Pub. Date: Feb. 22, 1996

[30] Foreign Application Priority Data

Aug. 10, 1994 [JP] Japan ................. 6-188372

[51] Int. Cl.⁶ ................................. B60R 19/00
[52] U.S. Cl. ........................... 293/102; 293/154
[58] Field of Search ..................... 293/102, 122, 293/120, 154

[56] References Cited

U.S. PATENT DOCUMENTS

| 3,014,710 | 12/1961 | Layne ..................... 293/102 |
|---|---|---|
| 4,904,008 | 2/1990 | Glance ..................... 293/102 |
| 4,951,986 | 8/1990 | Hanafusa et al. . |

FOREIGN PATENT DOCUMENTS

| 323038 | 7/1989 | European Pat. Off. ........ 293/102 |
|---|---|---|
| 0 502 648 A1 | 9/1992 | European Pat. Off. . |
| 63-18282 | 5/1988 | Japan . |
| 1-33404 | 10/1989 | Japan . |
| 2068245 | 3/1990 | Japan ..................... 293/102 |
| 3-49147 | 5/1991 | Japan . |

*Primary Examiner*—Gary C. Hoge
*Attorney, Agent, or Firm*—Flynn, Thiel, Boutell & Tanis, P.C.

[57] ABSTRACT

A resin-made shock absorbing member for a vehicle used as a bumper bean of the vehicle and the like and the method for producing the same. The resin-made shock absorbing member for the vehicle is structured to include an elongated curved portion (20) having a hollow portion, and an attachment portion (30) for fixing to a vehicle body (11) to be united and thus continuously formed with the curved portion (20) at both ends in the longitudinal direction of the curved portion (20). By structuring the attachment portions (30) to have a hollow portion and a solid portion, at least extending in the longitudinal direction of the curved portion (20), attachment work can be carried out from the outer side of the vehicle, and the shock absorbing function can be ensured along the whole length of the member (10).

18 Claims, 13 Drawing Sheets

F I G. 15
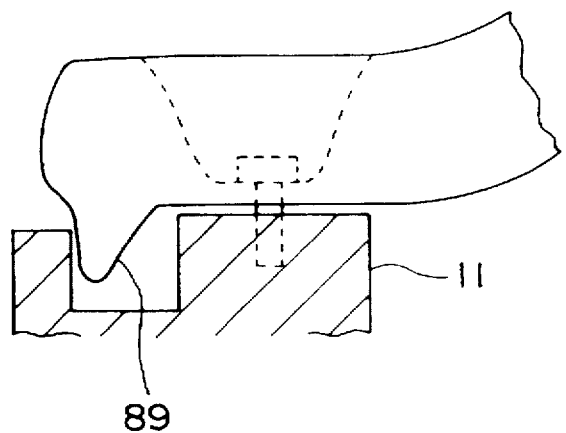

5,788,297

1

RESIN-MADE SHOCK ABSORBING MEMBER FOR A VEHICLE AND METHOD FOR PRODUCING THE SAME

TECHNICAL FIELD

This invention relates to a resin-made shock absorbing member for a vehicle and a method for producing the same.

BACKGROUND ART

Conventionally, a shock absorbing member for a vehicle, such as a bumper and a bumper beam, is made of metal. The metal bumper and the like have sufficient strength, but, several disadvantages, for example, heavy weight and easy corrosion. Consequently, in recent years, the bumper and the like which are made of plastics have been used in order to save resources and reduce weight.

The aforementioned plastic bumper and the like are usually produced by means of injection molding. But, by using injection molding in the production process, there are disadvantages in that a large molding apparatus is required in order to produce the bumper and the like that have relatively large moldings, and in that the molding apparatus is costly in view of the necessity of high pressure for the injection molding. Furthermore, by using injection molding in the production process, an outer configuration of the molding can be relatively freely designed by changing the cavity configuration in a die, but, it is difficult to produce the bumper and the like which have a hollow structure capable of effectively absorbing shock.

Consequently, for effective shock absorbing, it is proposed to use the shock absorbing member for a vehicle which has the hollow structure produced by means of blow molding.

FIG. 16 shows a bumper beam 90 as a conventional example of the shock absorbing member for a vehicle which has the hollow structure produced by means of blow molding.

The bumper beam 90 is composed of a curved portion 91 having the hollow structure and attachment portions 92 for fixing to a vehicle body and to be formed in such a way that it is united and thus continuously formed with the curved portion 91 at both ends, in the longitudinal direction, of the curved portion 91.

The attachment portion 92 forms a flat connection face 93. Connecting bolts 94, embedded in the attachment portion 92 during molding, are projected from the connection face 93. The attachment portion 92 has a hollow structure like the curved portion 91.

The bumper beam 90 is fixed to the vehicle body by tightening a nut (not shown) from the inner side of the vehicle body (from the right side in the drawing) to the bolt 94 at both attachment portions 92.

In other fixing methods, a method using both the embedded bolt 94 and a U-shaped bolt 95 together, as illustrated with a double-dotted line in the drawing, is employed at both attachment portions 92. The U-shaped bolt 95 is guided and fixed into a groove 96 which was previously formed on the opposite side from the connection face 93 of the attachment portion 92 shown with a double-dotted line in the drawing.

However, in the shock absorbing member for the vehicle, which has the hollow structure molded by conventional blow molding like the bumper beam 90 shown in FIG. 16, the attachment portion 92 as well as the curved portion 91 has the hollow portion, such that the connection bolts 94 are embedded, therefore, the shock absorbing member cannot be attached to the vehicle body from the outer side of the vehicle (the outer side of the vehicle does not imply the traveling direction of the vehicle but rather implies the side of the outer area of the vehicle and will imply such from now on), but rather has to be attached to the vehicle body from the inner side of the vehicle body (from the side of the connection face 93), therefore, there is a disadvantage in that a lot of time, work and effort are needed.

In the bumper beam 90 shown in FIG. 16, for the reason of the thin thickness of the attachment portion 92 or for the reason of the inferior workability of fixing the bumper beam 90 from the inner side of the vehicle body, instead of a bolt having a larger diameter that is impossible to use, a multiple of, for example, three or four, bolts 94 having relatively smaller diameters have to be used for each attachment portion 92, resulting in disadvantages in that the number of parts is increased and attachment work is complicated.

Although the aforementioned U-shaped bolts 95 are used, attachment work has to be carried out from the inner side of the vehicle body, resulting in a disadvantage in that a lot of time, work and effort are needed similarly.

Further, embodiment work of the bolts 94 when the bumper beam is molded causes the molding process to be complicated, resulting in the disadvantage of decreased efficiency in production.

It is an object of the present invention to provide the resin-made shock absorbing member for the vehicle and the method for producing the same, in which the shock absorbing member is capable of being easily produced and attached to the vehicle body, and having sufficient strength and shock absorbing function.

DISCLOSURE OF THE INVENTION

The present invention is intended to attain the aforementioned object to form a solid portion in an attachment portion.

More specifically, a resin-made shock absorbing member for a vehicle according to the present invention has properties including an elongated curved portion having a hollow portion, and an attachment portion for fixing to a vehicle body to be united and thus continuously formed with the curved portion at both ends in the longitudinal direction of the curved portion and to have a hollow portion and a solid portion, at least extending in the longitudinal direction of the curved portion.

The resin-made shock absorbing member for the vehicle according to the present invention has the property of a bolt hole passing through the attachment portion therein.

The resin-made shock absorbing member for the vehicle according to the present invention has the properties of the attachment portion having a flat connection face attached to the vehicle body and a concave portion formed on the opposite side of the solid portion from the connection face.

Further, the resin-made shock absorbing member for the vehicle according to the present invention has the property of the attachment portion having a hollow portion at each end, in a direction perpendicular to the longitudinal direction of the solid portion, of the attachment portion.

In the resin-made shock absorbing member for the vehicle according to the present invention as described thus far, it is advisable to provide an stopping portion, located on the inner side of the attachment portion close to the curved portion in the longitudinal direction of the shock absorbing member for the vehicle onto the vehicle body.

And, it is advisable that another stopping portion is provided on the outer side, in the longitudinal direction of the curved portion extending from the curved portion, of the attachment portion, so that the vehicle body is clamped between the stopping portion and the aforementioned stopping portion provided on the inner side of the attachment portion close to the curved portion.

The concave portion may be spatially surrounded by a bottom portion structured with the solid portion, side-wall portions extending from both sides of the bottom portion in a direction perpendicular to the longitudinal direction of the bottom portion, and connecting portions connecting the side-wall portions, and connecting the bottom portion and a front face portion formed on the opposite surface from the connection face.

Further, it is advisable that the concave portion has sufficient space to bolt a bolt inserted through a bolt hole to the vehicle body.

Here, the side-wall portion may be formed to cause the head of the bolt to be accommodated in the concave portion.

The present invention is a method for producing the resin-made shock absorbing member for the vehicle as described thus far, in which the production method is characterized by the formation of a hollow portion of the curved portion and a hollow portion of the attachment portion by using a hollow parison used in blow molding, and the formation of a solid portion of the attachment portion by melting together parison at each end, in the longitudinal direction of the hollow parison, of the hollow portion.

Further, it is advisable that the flat connection face provided in the attachment portion to fix to the vehicle body, and the face formed on the opposite side of the solid portion from the connection face, are formed to both correspond to the surface of a cavity.

Here, materials used for blow molding an be arbitrarily selected from thermoplastic resin conventionally used as materials for the resin-made shock absorbing member for the vehicle, such as a bumper.

For example, the following materials can be used: polypropylene, a high-density polyethylene, a linear low-density polyethylene, polyvinyl chloride, polycarbonate, polyamide, polyethylene terephthalate, polystyrene, polyoxymethylene, an ABS resin, an AS resin, polyphenylene ether, polyphenylene sulfide, ethylene-propylene rubber, ethylene-propylene diene three-dimensional rubber, or a compound resin thereof, and a compound in which the above resin is added with glass fiber, carbon fiber, talc, mica, calcium carbonate and so on as a bulking agent.

But, in order to carry out blow molding for the resin-made shock absorbing member for the vehicle which has a specified configuration in a case like the present invention, from the view of mechanical strength and molding workability, the physical properties of the molding, the shock resistance, the pinch-off strength and so on, the preferable material is a compound, a propylene homopolymer whose melt index (230° C., 2.16 kgf) is less that 2.0 g/10 min. and whose isotactic pentad ratio is more than 93 mole %, a propylene-ethylene block copolymer which consists of less than 15 wt % of ethylene per unit and whose melt index is less than 1.0 g/10 min. and whose isotactic pentad ratio is more than 93 mole %, or a polypropylene type resin like those of a propylene homopolymer and a propylene-ethylene block copolymer, added with another resin, for example high-density polyethylene, elastomer, for example an ethylene-propylene type elastomer, an ethylene-α-olefin (except propylene) type elastomer, an ethylene-propylene-diene type elastomer, or one type selected from bulking agents, for example talc.

Here, it is recommended to use a propylene type polymer in the range of 60–99 wt %, high-density polyethylene in the range of 0–30 wt %, ethylene-α-olefin type elastomer in the range of 0–20 wt %, and a bulking agent in the range of 0–40 wt % such as talc.

The compound can be added, as necessary, with thermoplastic resin, such as polyolefine modified by the derivative of unsaturated carboxylic acid or modified by unsaturated carboxylic acid such as acrylic acid and maleic anhydride, with an inorganic filler such as calcium carbonate, mica, glass fiber, and carbon fiber, or with various additives, such as an antioxidant, an ultraviolet absorption agent, a heat stabilizer, a sliding agent, a flame retardant, and a stain.

In the present invention as described thus far, the resin-made shock absorbing member for the vehicle is attached to the vehicle body at the attachment portion, therefore, the impact received to the vehicle is absorbed through the elongated curved portion and the attachment portion.

At this time, the curved portion and the attachment portion both have hollow portions, in which the hollow portion is provided along the whole length of the resin-made shock absorbing member for the vehicle, with the result that the shock absorbing function can be obtained along the whole length of the member as well as for the resin-made shock absorbing member for the vehicle which has the hollow structure by means of the conventional blow molding as shown in the aforementioned bumper beam 90 of FIG. 16.

The solid portion is formed in the attachment portion, whereby embedment work of the connecting bolt 94 for the attachment portion 92 as shown in the bumper beam 90 of FIG. 16 is necessary when the resin-made shock absorbing member for the vehicle according to the present invention is fixed to the vehicle body. More specifically, in the bumper beam shown in FIG. 16, for the hollow structure of the attachment portion 92, if the bumper beam is attached with the bolt from the outer side of the vehicle, with the bolt passing through the hollow portion, then the bolt is unstable, with the result that embedment work of the bolt is needed, however, this disadvantage is resolved in the present invention.

As a result, by passing the connection means, such as a bolt, a rivet, or a caulked projection member (a member projecting from the vehicle body), through the solid portion formed in the attachment portion, attachment work can be carried out from the outer side of the vehicle, namely, from the opposite side of the attachment portion from the attachment face, resulting in an easier attachment operation and improved productivity.

For example, when the bolt is used as the connection means along with the bolt hole passing through the solid portion in the attachment portion, attachment work can be carried out by inserting the bolting the bolt from the outer side of the vehicle into the bolt hole.

Further, when the rivet or the caulked projection member is used as the connection means, work crushing the head of the rivet, work opening the legs of a split rivet, or work bending and caulking the caulked projection member can be carried out from the outer side of the vehicle.

The embedment work of the bolt 94 as shown in the bumper beam 90 of FIG. 16 is not needed, resulting in a simplified molding process and, naturally, improved productivity.

By being a suitable thickness for the solid portion in the attachment portion, as compared with the bumper beam 90 shown in FIG. 16, the number of connecting bolts can be reduced, and attachment work can be completed by using two bolts, one bolt for each attachment portion, whereby the simplified structure, the reduced number of parts and easier operation are implemented, resulting in the attainment of the aforementioned object.

When the attachment portion is structured to be composed of the flat connection face attaching to the vehicle body and the concave portion formed on the opposite side of the solid portion from the connection face, a part of the connection means such as the head of the bolt is to be hidden in the concave portion after connection, whereby the appearance of the vehicle can be improved, and the configuration of the vehicle body corresponding to the attachment portion of the bumper beam is simplified in view of the flat connection face.

When the attachment portion is structured to have the hollow portion at each end, in the direction perpendicular to the longitudinal direction of the solid portion, the shock absorbing function working at the attachment portion can be further improved, resulting in improved shock absorbing functioning along the whole length of the member.

If the stopping portion is provided on the side of the attachment portion closest to the curved portion in order to be fitted, in the same direction as the longitudinal direction of the shock absorbing member, attached to the vehicle body, the stopping portion dampens force being applied in the longitudinal direction of the resin-made shock absorbing member for the vehicle (force being applied in a direction in which both attachment portions provided at the ends of the member are moved away from each other by extending the curved portion) when the resin-made shock absorbing member for the vehicle receives an impact, whereby the shock to the connection portion, between the attachment portion and the vehicle body, can be eased, resulting in the reduction of the number of connection bolts needed.

Furthermore, another stopping portion is provided on the opposite side, in the longitudinal direction of the curved portion, of the attachment portion from the aforementioned stopping portion to be further from the curved portion, so that the vehicle body can be clamped between the aforementioned stopping portion provided at the side of the attachment portion close to the curved portion and this stopping portion, whereby the resin-made shock absorbing member for the vehicle can be fitted when the resin-made shock absorbing member for the vehicle is attached to the vehicle body, resulting in easier attachment work of the resin-made shock absorbing member for the vehicle. Incidentally, the type of stopping portion is not limited, but the force being applied in the longitudinal direction of the shock absorbing member should be dampened. For example, the force may be dampened by a type of stopper, such as a projection for stopping, or a concave portion into which the attachment portion provided on the vehicle body is inserted.

The concave portion is composed of a bottom portion structured with the solid portion, side-wall portions extending from both sides of the bottom portion in a direction perpendicular to the longitudinal direction of the bottom portion, and a connecting portion connecting the side-wall portions and connecting the bottom portion and a front face portion formed on the opposite surface from the connection face, whereby sufficient room for attachment can be ensured and, thus, the strength at the attachment portion can be increased.

The size of the concave portion is to be sufficient in size, whereby the bolting work of the bolt, passing through the bolt hole to the vehicle body, can take place smoothly and easily.

Further, the side-wall portion is formed to accommodate the head of the bolt in the concave portion, resulting in improved appearance of the vehicle.

The resin-made shock absorbing member for the vehicle according to the present invention as described thus far can be easily produced by using blow molding. That is, by using the hollow parison, the hollow portion formed in the curved portion and the hollow portion formed in the attachment portion can be easily formed, and further, by melting together parison along parts of both ends, in the longitudinal direction of the parison, of the hollow parison, the solid portion formed in the attachment portion can be easily formed.

The thickness of the solid portion for the attachment portion, which is formed by melting together parison as mentioned in the aforementioned description, is thicker than the thickness of the attachment portion 92 (which is formed with a sheet of parison) in the bumper beam 90 shown in FIG. 16, whereby greater strength can be obtained and the number of connecting bolts can be reliably reduced.

The flat connection face, which attaches the attachment portion to the vehicle body, and the face, which is formed on the opposite side of the solid portion from the connection face, are formed to coincide with the surface of the cavity, whereby a necessary parallelism, which allows easy bolting of the bolt, can be ensured.

BRIEF DESCRIPTION OF DRAWINGS

FIG. 15 is a block diagram showing a seventh modification according to the present invention;

BEST MODE FOR CARRYING OUT THE INVENTION

Figure 1:
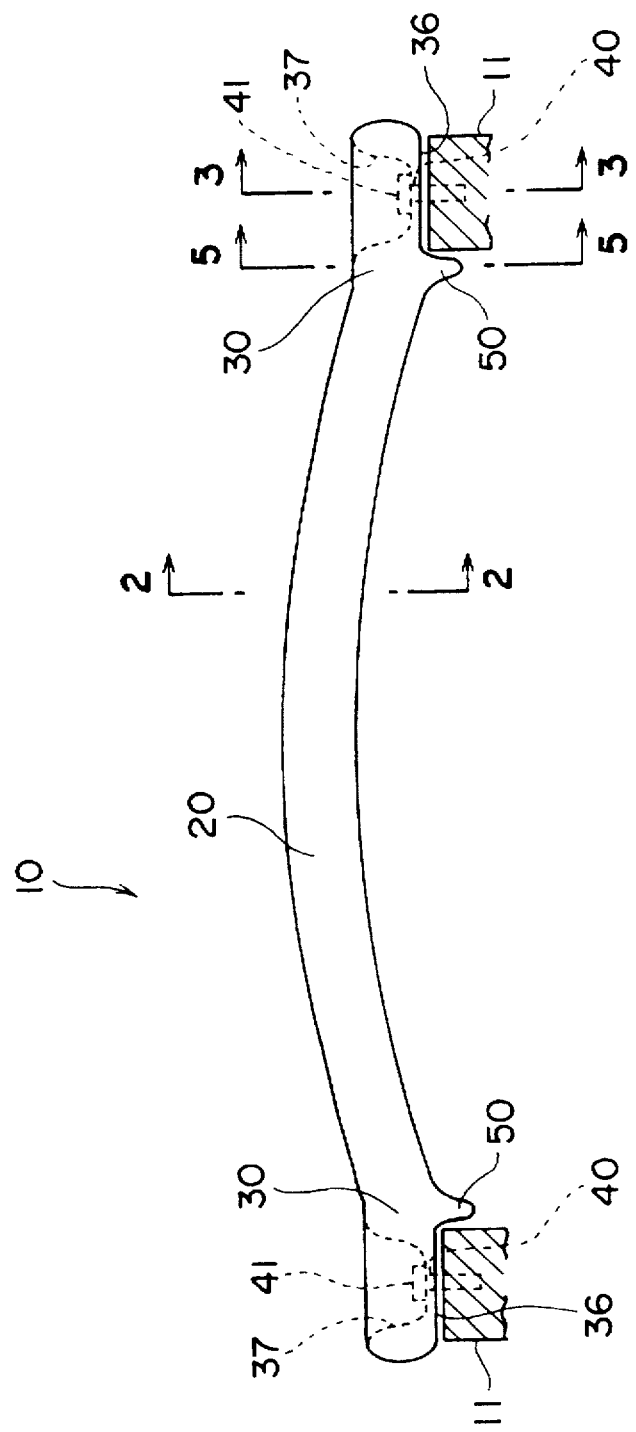
FIG. 1 is an overall block diagram showing a first embodiment according to the present invention.

Preferred embodiments of the present invention will now be described with reference to the drawings. Incidentally, in the description of each of the following embodiments, the same reference numerals will be used to designate the same or similar components as those in a first embodiment, so that the description is omitted or simplified.

FIG. 1 shows a manner in which a bumper beam 10 as a resin-made shock absorbing member for a vehicle of the first embodiment is fixed to a vehicle body 11.

The bumper beam 10 is of a molding, molded by means of blow molding, and includes an elongated curved portion 20 extended in the longitudinal direction of FIG. 1, and an attachment portion 30, for fixing to a vehicle body, to be united and thus continuously formed with the curved portion 20 at both ends, in the longitudinal direction, of the curved portion 20.

Figure 2:
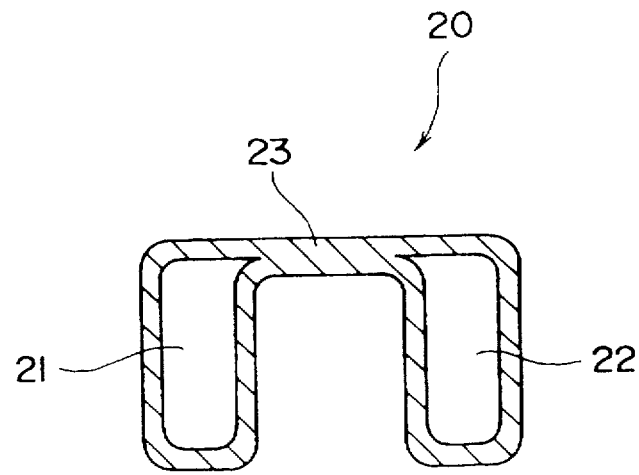
FIG. 2 is a sectional view of a curved portion in the first embodiment taken along the line 2—2 of FIG. 1.

FIG. 2 shows a sectional view of the curved portion 20 taken along the 2—2 line in FIG. 1.

The curved portion 20 has two hollow portions 21 and 22 along each end in a direction perpendicular to the longitudinal direction of the curved portion 20 (a direction transverse to the longitudinal direction of FIG. 2).

Further, between those hollow portions 21 and 22, a solid portion 23 is formed. The solid portion 23 is formed by fusing together the parison by pushing a part of the parison (the lower portion of FIG. 2) outwards from the outer side of the vehicle body (the upper portion of FIG. 2) with dies in the blow molding.

The curved portion 20 continuously has the sectional configuration as seen in FIG. 2 in the longitudinal direction of the curved portion 20.

Figure 3:
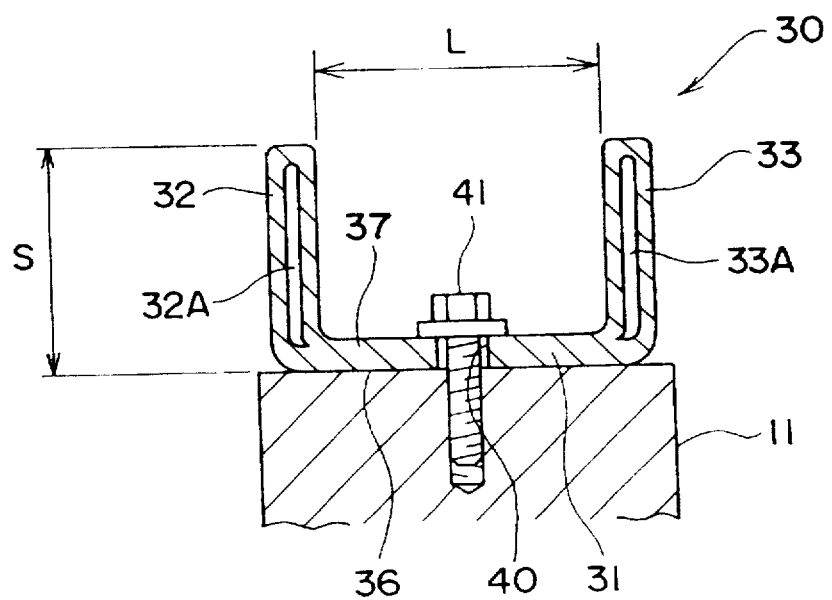
FIG. 3 is a sectional view of an attachment portion in the first embodiment taken along the line 3—3 of FIG. 1.
Figure 4:
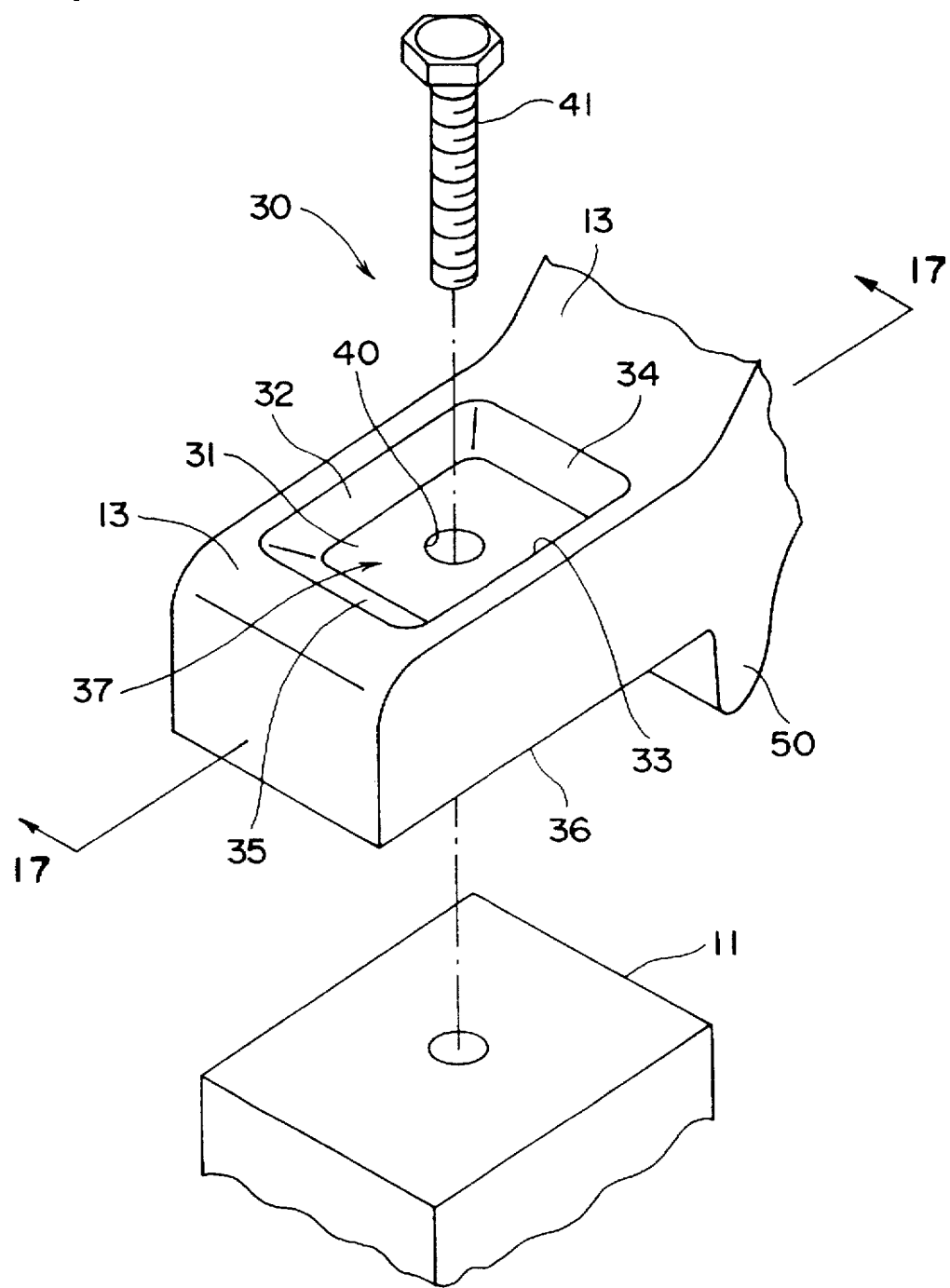
FIG. 4 is an exploded perspective view of the attachment portion in the first embodiment.

FIG. 3 shows a sectional view of the attachment portion 30 taken along the B—B line in FIG. 1, and an exploded perspective view of the attachment portion 30 is shown in FIG. 4.

Figure 17:
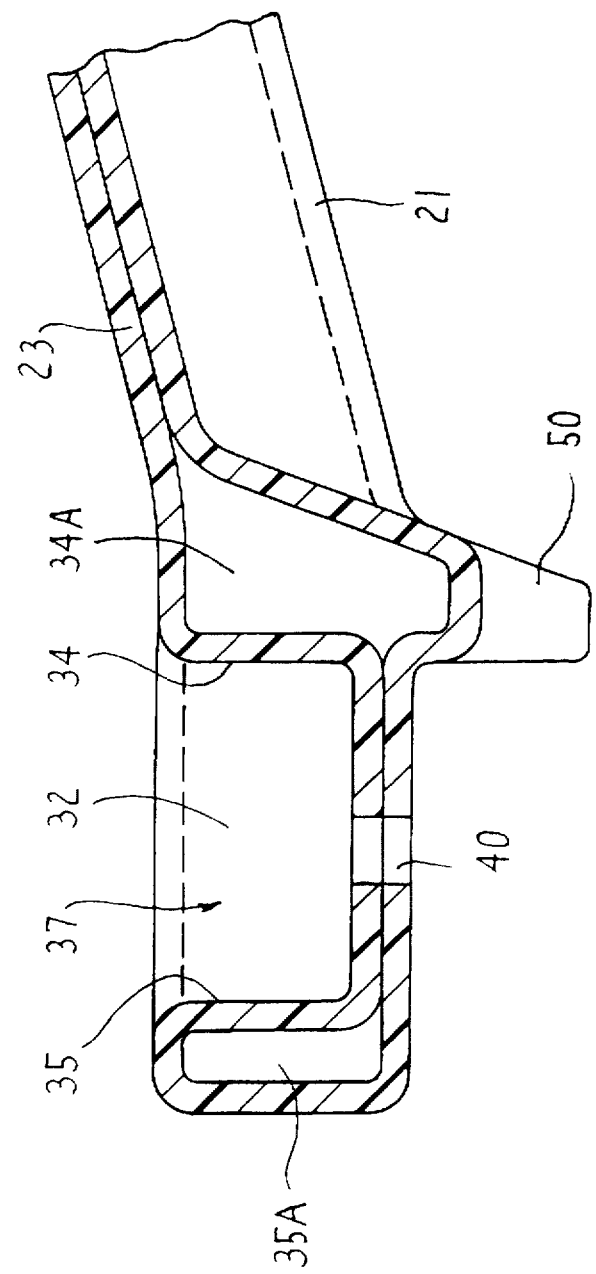
FIG. 17 is a sectional view of the molding taken along the line 17—17 of FIG. 4 and corresponding to Experiment No. 8 depicted in FIG. 6.
Figure 18:
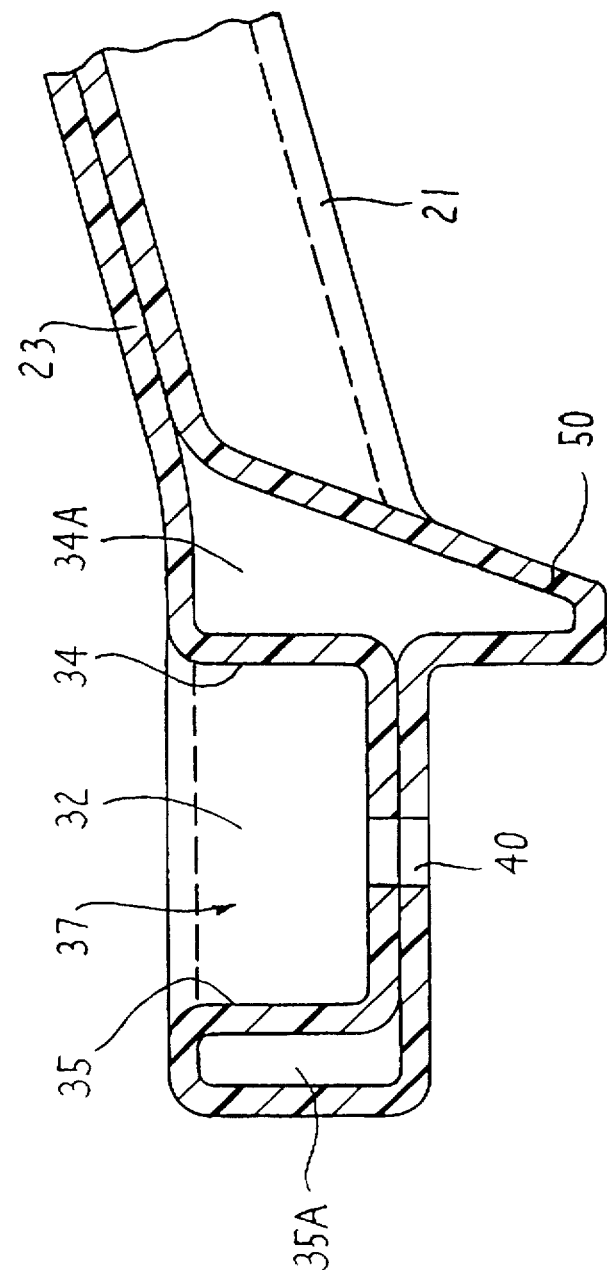
FIG. 18 is a sectional view of the molding taken along the line 17—17 of FIG. 4 and corresponding to Experiment No. 10 in FIG. 6.

In FIG. 3, the attachment portion 30 includes a bottom portion 31 formed along a part attaching the attachment portion 30 to the vehicle body 11, and side-wall portions 32 and 33 extending in a direction outwards from the outer side of the vehicle body (toward the upper side of FIG. 3) from both ends, in the direction perpendicular to the longitudinal direction of the bottom portion 31. The bottom portion 31 is a solid portion formed by melting together parison in the blow molding, and further, the side-wall portions 32, 33, 34 and 35 respectively have hollow portions 32A, 33A, 34A and 35A therein (see also FIG. 17).

In FIG. 4, the attachment portion 30 includes connecting portions 34 and 35 which are formed to connect the bottom portion 31 and a front face 13 of the bumper beam 10. The connection portions 34 and 35 are respectively formed with a sheet of parison. A portion from the connecting portion 35 to the end of the bumper beam 10 (the opposite side of a concave portion 37 from the curved portion 20) is formed to be a hollow structure.

On the lower surface of the bottom portion 31 in the lower part of FIG. 3, a flat connection face 36 is formed to attach and fix to the vehicle body 11.

On the opposite side (the outer side of the vehicle) from the connection face 36 provided in the attachment portion 30, a concave portion or cavity 37 is formed to recess towards the vehicle body 11. The concave portion 37 is contained by the bottom portion 31, the side-walls 32 and 33, and the connection portions 34 and 35.

The bottom portion 31 is provided with a bolt hole 40 formed to pass from the outer side of the vehicle to the connection face 36. A connecting bolt 41 is passed through the bolt hole 40, a total of two bolts 41 with respect to each bumper beam 10 to thereby fix the bumper beam 10 to the vehicle body 11 are mutually fixed.

Each height S of the side-wall portions 32 and 33 is approximately the same height as the curved portion 20, so that the head of the bolt 41 is accommodated in the concave portion 37 so as not to project from the line of the front face 13 of the bumper beam 10 in a direction outwards from the outer side of the vehicle.

Width L of the concave portion 37 is sufficient to carry out the bolting work of the bolt 41.

Returning to FIG. 1, each attachment portion 30 is provided with a fitting projection (a stopper) 50 as a stopping portion having a hollow structure projecting towards the lower side of the drawing at the end of the curved portion 20. The fitting projection 50 is provided in order to stop the force, which results when the bumper beam 10 moves toward the vehicle body 11, in the longitudinal direction of the bumper beam 10 when the vehicle receives an impact.

Figure 5:
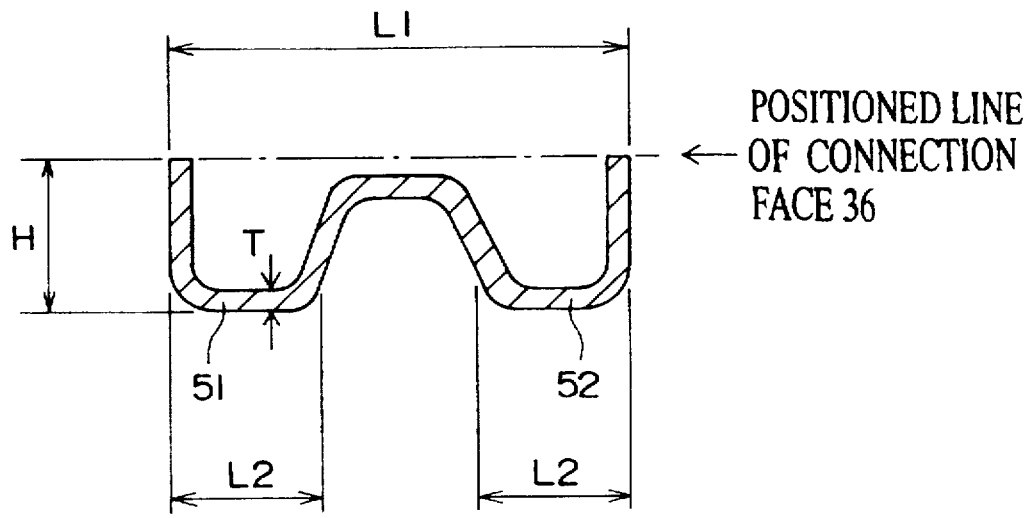
FIG. 5 is a sectional view of a stopping portion of the first embodiment taken along the line 5—5 of FIG. 1.

FIG. 5 shows a sectional view of the fitting projection 50 taken along the 5—5 line in FIG. 1.

The fitting projection 50 is a sectional uneven configuration and includes two protrusion portions 51 and 52 at both its ends in a direction perpendicular to the longitudinal direction of the fitting projection 50.

In the first embodiment as described thus far, the production of the bumper beam 10 and the attachment of the bumper beam 10 to the vehicle body 11 will be described.

First, the bumper beam 10 is produced by means of blow molding by clamping tubular parison in a molding die (not-shown), having a cavity which is formed based on the outer configuration of the bumper beam, with pressure from the outside, and then, adhering the clamped tubular parison onto the surface of the cavity in the molding die by expanding the parison by blowing air into a hollow portion in the tubular parison.

At this time, by clamping parison with the molding die, the solid portion 23 of the curved portion 20 is formed by jointly melting together two sheets of parison, and similarly, the bottom portion 31 of the solid portion of each attachment portion 30 is formed.

By blowing air into the hollow portion of the tubular parison in a closed molding die state, both end portions, in a direction perpendicular to the longitudinal direction of the bumper beam, which has the fitting projections 50 and the hollow portions 21 and 22 of the curved portion 20, and the side-wall portions 32 and 33 having the hollow portions 32A and 33A of the attachment portions 30, are formed.

Next, the bumper beam 10 formed as described above is taken out from the die, and is placed to fit the fitting projections 50 and the connection faces 36 to the specified position on the vehicle body 11.

The connecting bolt 41 is inserted from the outer side of the vehicle into the bolt hole 40, and is bolted from the outer side of the vehicle to fix the bumper beam 10 to the vehicle body 11.

According to the first embodiment, the following effects will be listed.

That is, the bottom portions 31, as the solid portions, are provided in the attachment portion 30, therefore, the bolting work of the bolt 41 can be carried out from the outer side of the vehicle by inserting the bolt 41 from the outer side of the vehicle into the bolt hole 40 formed to pass through the bottom portion 31.

Figure 16:
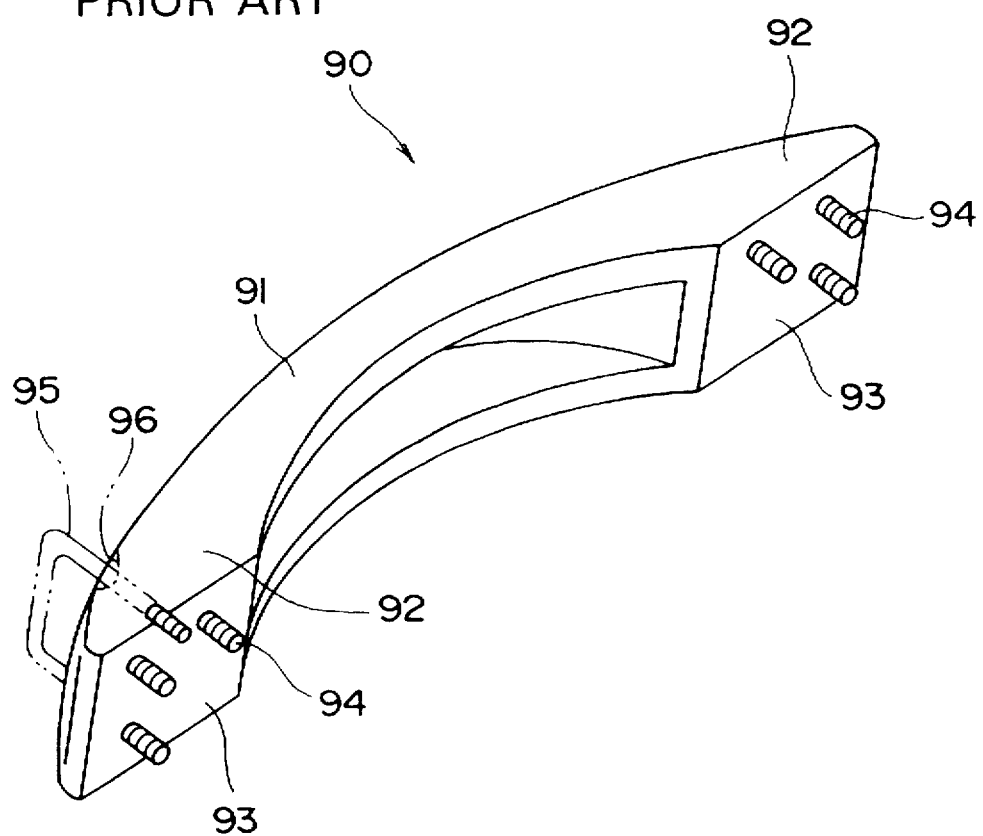
FIG. 16 is a perspective view showing a conventional example.

Accordingly, as compared with conventional attachment work from the inner side of the vehicle body 11, easier work and increased productivity are attained, furthermore, an embedding process of a bolt 94 as shown in a conventional bumper beam 90 of FIG. 16 can be unnecessary, and naturally, the molding process is simplified, thereby from this view, increased productivity can also be attained.

The bottom portion 31 as the solid portion is formed by jointly melting together parison, thus, the thickness of the attachment portion can be thicker than an attachment 92 (formed with a sheet of parison) of the conventional bumper beam 90 shown in FIG. 16. As a consequence, the number of bolts can be reduced by using, for example, a bolt having a relatively larger diameter, that is, as described in the embodiment, the bumper beam can be fixed with a total of two bolts 41, one bolt for each attachment portion 30, resulting in a reduction of the number of parts and simplified work.

Both faces (the connection face 36 and the bottom face of the concave portion 37) of the bottom portion 31 are formed to correspond with the surface of the cavity in the molding die, thus, a necessary parallelism of both faces easily ensures bolting of the bolt 41. In this case, by forming the surface of the connection face 36 to be higher, for example, 1–2 mm higher than the surrounding surfaces around the edge of the connection face 36 (to be projected to the vehicle body 11), the preferred connection face 36 having the suitable parallelism with the bottom face of the concave portion 37 can be obtained.

By providing the concave portion 37 in the attachment portion 30, the head of the bolt 41 can be accommodated in the concave portion 37, resulting in improved appearance of the vehicle.

Width L of the concave portion 37 is sufficient to allow the bolting of the bolt 41, resulting in smoother and easier bolting work.

Provision of the fitting projection 50 causes the bumper beam 10 to dampen force directed in the longitudinal direction of the bumper beam 10 (force being applied such that the distance between the attachment portions 30 formed at both ends of the bumper beam 10 is longer by extending the bumper beam 10) when the bumper beam receives an impact, whereby the number of connecting bolts can be reduced and the attachment by a total of two bolts 41 in this embodiment is allowed.

Further, the hollow portions 21 and 22 are provided in the curved portion 20, and also, the hollow portions 32A and 33A are provided in the attachment portion 30, that is, the hollow portions are provided along the whole length of the bumper beam 10, whereby the shock absorbing member can obtain sufficient shock absorbing functioning along its whole length similar to that of a conventional resin-made shock absorbing member for a vehicle which has the hollow structure molded with conventional blow molding like the bumper beam 90 shown in FIG. 16.

In order to ascertain the effect according to the first embodiment, a series of experiments using a 5 MPH Pendulum test were carried out as described below.

Figure 6:
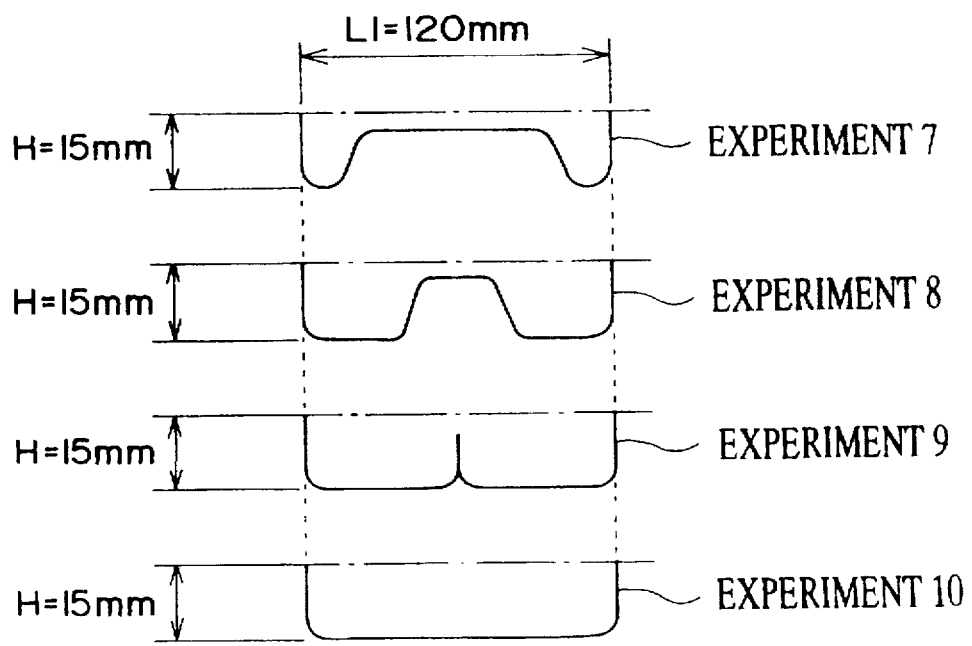
FIG. 6 are sectional views of the stopping portion of an experimental example according to the present invention.

In a series of experiments of the first embodiment, bumper beams changed, in regards to height H and thickness T of a stopper as the fitting projection in a sectional configuration of FIG. 5 (Experiments 1 to 6), and bumper beams changed in regards to width L2 of each protrusion portion formed at both ends of the stopper and thickness T of the stopper but fixed at 15 mm of Height H of the stopper as shown in FIGS. 6 (Experiments 7 to 10), were prepared. Furthermore, the overall width L1 of the stopper was defined as 120 mm.

As a reference example for Experiments 1 to 10, the conventional bumper beam 90 shown in FIG. 16 was assigned.

Resin, used as raw material for the bumper beams in Experiments 1 to 10 and the Reference Experiment, is of a resin component with the following:

(1) 65 wt % of polypropylene (made by IDEMITSU PETROCHEMICAL CO., LTD.: E250G) whose melt index is 1 g/10 min.;

(2) 20 wt % of high-density polyethylene (made by IDEMITSU PETROCHEMICAL CO., LTD.: 750LB) whose melt index is 0.03 g/10 min.;

(3) 5 wt % of ethylene-propylene elastomer (made by Japan Synthetic Rubber Co., Ltd.: EP07P) which consists of 73 wt % of ethylene and has Mooney viscosity of $ML_{1+4}$ (100° C.)=77; and (4) 10 wt % of a talc whose average particle diameter is 1.5 μm and average aspect ratio is 15.

The following are molding conditions and temperature conditions.

| [MOLDING CONDITIONS] | | |
|---|---|---|
| MOLDING APPARATUS | | 90 mmφ |
| SCREW | | 90 mmφ |
| DIE | | 100 mmφ |
| ACCUMULATOR | | 25 liters |
| PRESSURE OF CLAMPING DIE | | 60 tons |
| ROTATIONAL FREQUENCY OF SCREW | | 40 rpm |
| LOAD OF MOTOR | | 115 A |
| [TEMPERATURE CONDITIONS] | | |
| CYLINDER | No. 1 | 230° C. |
| | No. 2 | 210° C. |
| | No. 3 | 190° C. |
| | No. 4 | 190° C. |
| CROSSHEAD | No. 1 | 190° C. |
| | No. 2 | 190° C. |
| | No. 3 | 190° C. |
| DIE | No. 1 | 190° C. |
| | No. 2 | 190° C. |
| MOLDING CYCLE | | 200 sec. |
| TEMPERATURE OF DIE | | 28° C. |
| TEMPERATURE OF RESIN | | 225° C. |

The bumper beams (the degree of the gradient α of the curved portion with the attachment portion is 48°), as an object of Experiments 1 to 10 and the Reference Experiment, which were molded under the aforementioned conditions, underwent the 5 MPH pendulum test (impacting speed 8 Km/Hr=5 mile/Hr), in which the weight of the bumper beam product was 3.5 Kg, the length of the bumper beam product was 1.4 m, the weight of the vehicle was 1,000 Kg and the temperature was a room temperature, and a total evaluation was obtained by checking the maximum degree of deformation, the maximum generated load, and a buckling state of the stopper as to Experiments 1 to 10 and the Reference Experiment.

The results of the comparative experiments are shown in Table 1 and Table 2, in which the results in regard to the Reference Experiment and Experiments 1 to 6 are shown in Table 1, and the results in regard to Experiments 7 to 10 are shown in Table 2.

TABLE 1

|  | RE | E1 | E2 | E3 | E4 | E5 | E6 |
|---|---|---|---|---|---|---|---|
| Height of the stopper: H (mm) | — | 0 | 5 | 10 | 15 | 20 | 25 |
| Thickness of the stopping portion: T (mm) | — | 4.5 | 4.0 | 3.5 | 3.0 | 2.3 | 1.8 |
| Maximum degree of deformation (mm) | 44 | 65 | 55 | 45 | 42 | 44 | 49 |
| Maximum generated load (ton) | 3.5 | 2.3 | 2.6 | 3.5 | 3.8 | 3.4 | 3.0 |
| Buckling state of the stopper | bolt came out | x | x | Δ~○ | ○ | Δ | x~Δ |
| Total Evaluation | Good | Practical | Practical | Good | Optimum | Good | Practical |

RE: Reference Experiment
E: Experiment

TABLE 2

| Height of the stopper: H = 15 mm | E7 | E8 | E9 | E10 |
|---|---|---|---|---|
| Width of the stopper: L2 (mm) | <15 | 15–60 | 60 | >60 |
| Thickness of the stopping portion: T (mm) | <2.0 | 2.5–3.1 | 3.0 | 3.0 |
| Maximum degree of deformation (mm) | 50 | 42 | 40 | 52 |
| Maximum generated load (ton) | 2.9 | 3.8 | 3.9 | 2.8 |
| Buckling state of the stopper | x~Δ | ○ | ○ | x~Δ |
| Total Evaluation | Practical | Optimum | Optimum | Practical |

E: Experiment

According to Table 1, in Experiments 3 to 5 in which height H of the stopper was 10 mm to 20 mm, the maximum degree of deformation was small and the maximum generated load was large, therefore, the total evaluation results were Good, in which performance can be evaluated to be the same as or higher than the Reference Experiment. Especially, in the case of Experiment 4 in which height H of the stopper was 15 mm the result was Optimum. The other Experiments 1, 2 and 6 were inferior in total evaluation compared to the Reference Experiment, but were sufficiently Practical. As a result, it is understood that the bumper beam can be produced to have higher performance by adjusting the height H of the stopper to suitable heights.

According to Table 2, in Experiments 8 and 9 in which width L2 of each protrusion portion formed at the end of the stopper was 15–60 mm, the maximum degree of deformation was small and the maximum generated load was large, therefore, the total evaluation results were extremely Good, in which an improved performance than the Reference Experiment was obtained. Experiments 7 and 10 were also inferior in total evaluation compared to the Reference Experiment, but were sufficiently Practical. As a result, it is understood that the bumper beam can be produced to have an improved performance by adjusting the sectional configuration of the stopper to suitable configurations.

Incidentally, in these experiments, the evaluation was obtained by using only one type of component of polypropylene resin, naturally, bumper beams having higher performance can be produced by suitably changing a combination of the conditions, such as a change of resin and a change in sectional configuration.

From the aforementioned results of the experiment, the bumper beam according to the first embodiment can ensure strength and the shock absorbing function with sufficient practical usage, namely, the effects of the first embodiment are pronounced.

A second embodiment according to the present invention is explained below with reference to FIG. 7 and FIG. 8.

Figure 8:
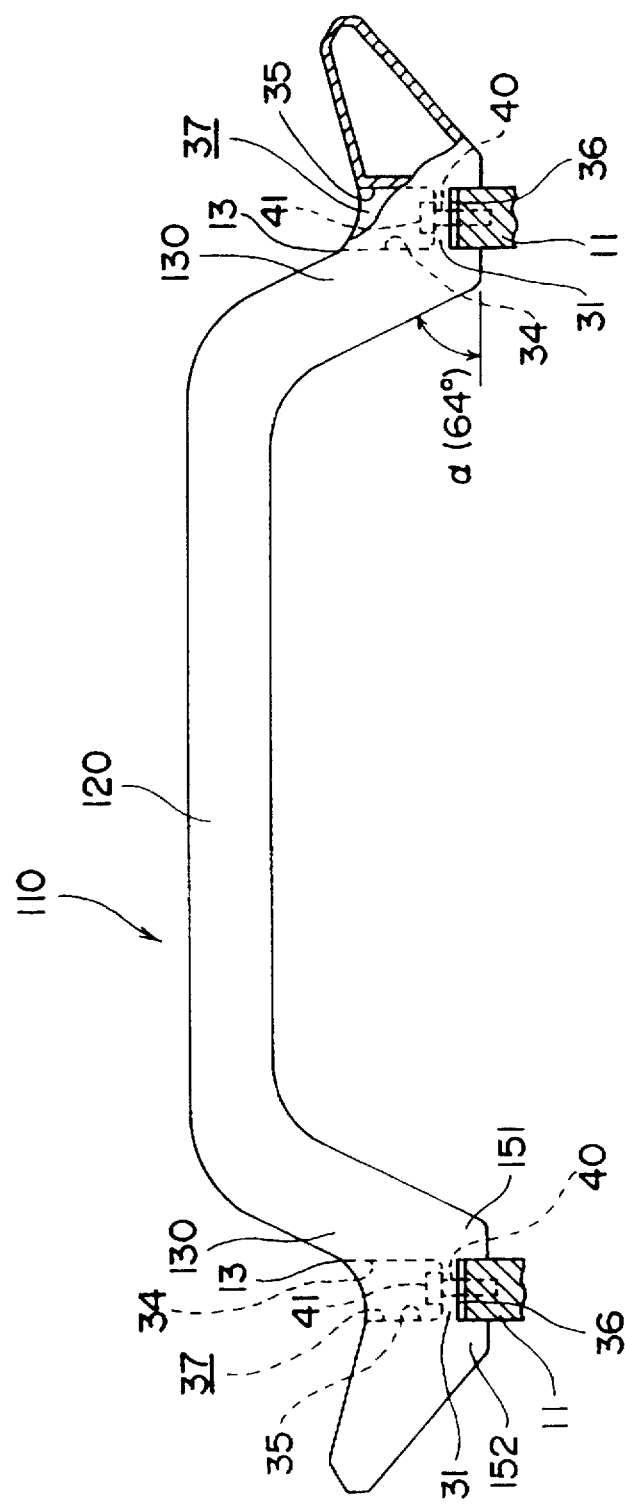
FIG. 8 is an overall block diagram showing the second embodiment which has a different degree of the gradient of the curved portion than from a shock absorbing member for a vehicle shown in FIG. 7.

The second embodiment has a different structure of the end portions of the bumper beam and fitting projections from the first embodiment, and further, has a different degree of gradient of the curved portion from the first embodiment as shown in FIG. 8, but the other structures are the same as the first embodiment.

Figure 7:
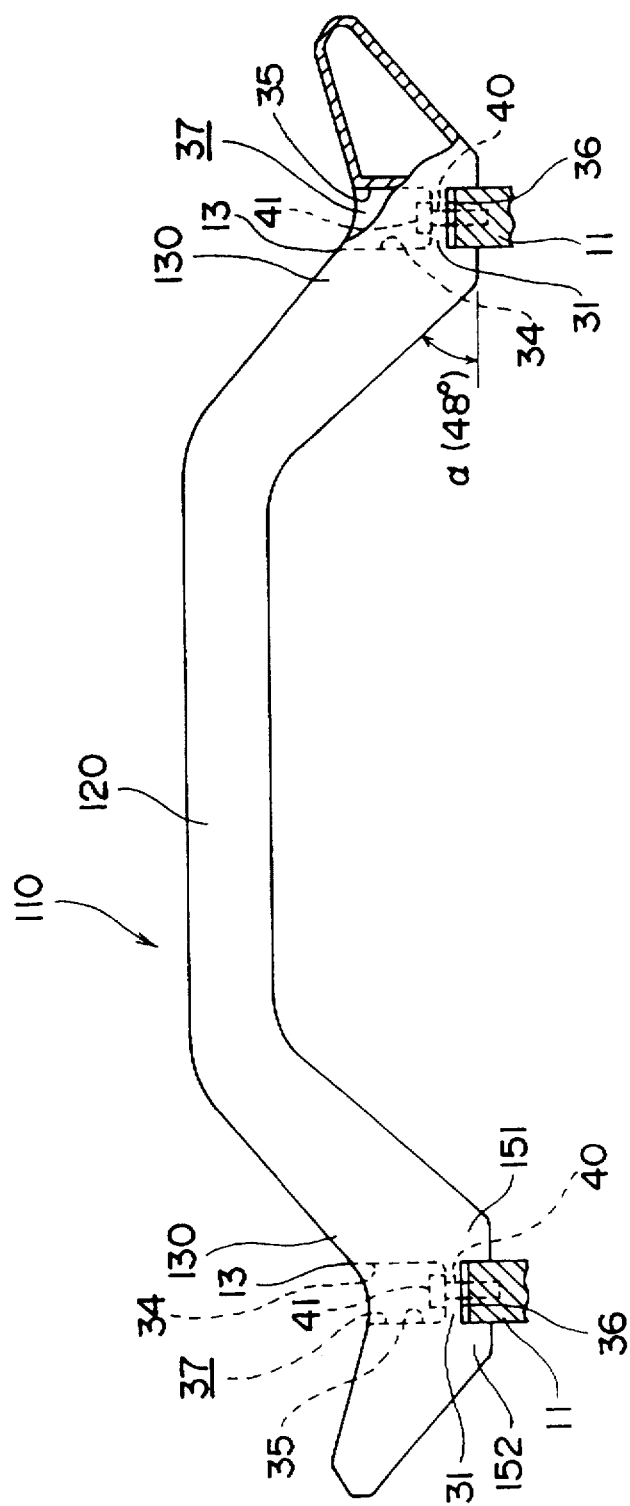
FIG. 7 is an overall block diagram showing a second embodiment according to the present invention.

More specifically, a bumper beam 110 of the second embodiment includes an elongated curved portion 120 extended in the longitudinal direction of FIG. 7, and an attachment portion 130, for fixing to a vehicle body, to be united and thus continuously formed with the curved portion 120 at both ends in the longitudinal direction of the curved portion 120.

The curved portion 120 has the same sectional configuration as the curved portion 20 of the first embodiment. That is, the curved portion 120 has the aforementioned two hollow portions 21 and 22 (see FIG. 2) at both ends of the curved portion 120 in a direction transverse to the longitudinal direction of the curved portion 120 (a direction perpendicular to the plane of the paper in FIG. 7), in which the solid portion 23 (see FIG. 2) is formed between the hollow portions 21 and 22. The curved portion 120 is parallel to the vehicle body 11 at its central portion, and has a degree α of gradient against the vehicle body 11 at both ends of the curved portion which connects to the attachment portions 130. The degree α of gradient is provided in order that the maximum load is larger when the bumper beam is impacted, for example, it is defined at 48° in FIG. 7, and 64° in FIG. 8.

The attachment portion 130 has the same sectional configuration as the attachment portion 30 of the first embodiment, and includes the aforementioned bottom portion 31 and the aforementioned side-wall portions 32 and 33 (see FIG. 3) extending from the outer side of the vehicle body from both ends, in the direction perpendicular to the longitudinal direction of the bottom portion 30, of the bottom portion 31, in which the bottom portion 31 is the solid portion, and the side-wall portions 32 and 33 have the aforementioned hollow portions 32A and 33A.

The attachment portion 130 has the connecting portions 34 and 35 which are formed to connect the bottom portion 31 and the front face portion 13 of the bumper beam 110, in which a portion from the connecting portion 35 to the end of the bumper beam 110 is formed to be a hollow structure. Both extreme ends of the bumper beam in the longitudinal direction are formed to curve from the bottom portion 31 in a direction turning away from the vehicle body 11.

On the lower surface of the bottom portion 31 in the lower side of FIG. 7, a flat connection face 36 is formed to attach and fix to the vehicle body 11, and on the opposite side (the outer side of the vehicle) from the connection face 36, provided in the attachment portion 130, a concave portion 37 is formed with a recess towards the vehicle body 11. The concave portion 37 is contained by the bottom portion 31, the side-walls 32 and 33, and the connection portions 34 and 35.

The bottom portion 31 is provided with the bolt hole 40, in which the connecting bolt 41 is passed through the bolt hole 40, a total of two bolts 41 with respect to each attachment portion 130, thereby the bumper beam 110 and the vehicle body 11 are mutually fixed.

Each attachment portion 130 is provided with a first fitting projection (a stopper) 151 as a stopping portion having a hollow structure to project toward the lower side of the drawing at the end of the curved portion 120. The first fitting projection 151 is provided in order to stop the force, which results when the bumper beam 110 moves toward the vehicle body 11, in the longitudinal direction of the bumper beam 110 when the bumper beam receives an impact. Further, a second fitting projection 152 as the stopping portion is provided on the opposite side, in the longitudinal direction of the curved portion 120, of the attachment portion 130 from the first fitting projection 151 to be further from the curved portion 120, thereby it is structured that an attachment portion provided on the vehicle body 11 is clamped between this second fitting projection 152 and the first fitting projection 151 provided on the side of the attachment portion closer to the curved portion.

As a result, in the second embodiment, the following effects are listed in addition to the effects described in the first embodiment. More specifically, the degree α of the gradient which is formed at each end of the curved portion 120 is relatively large, whereby the maximum load of the impact can be heavy. Additionally, it is structured such that the second fitting projection 152 is provided on the opposite side, in the longitudinal direction of the curved portion 120, of the connection face 36 from the first fitting projection 151, to be further from the curved portion 120, to be able to cause the attachment portion provided on the vehicle body 11 to be clamped between the second fitting projection 152 and the first fitting projection 151 that is provided closer to the curved portion than the second fitting projection 152, so that the bumper beam 110 can have its position decided when being fixed to the vehicle body 11, resulting in easier attachment work to the vehicle body 11 for the bumper beam 110.

In order to verify the effects of the second embodiment, a series of 5 MPH pendulum tests and 5 MPH barrier tests were undertaken as described below.

In these experiments, the attachment of the bumper beam to the vehicle body 11 was carried out by using one bolt 8 mm in diameter and the weight of the bumper beam product was 4 Kg. The conditions of the 5 MPH pendulum tests were based on those conditions of the first embodiment. The 5 MPH barrier tests were undertaken under the condition in which the vehicle, weighing 1,000 kg, attached with the bumper beam impacted against a concrete wall (impact speed 8 Km/Hr=5 mile/Hr).

The results are shown in Table 3.

TABLE 3

| Height of the stopper: H = 15 mm | E 11 | E 12 |
|---|---|---|
| The degree of the gradient of the curved portion (α) | 48° | 64° |
| Pendulum Test | | |
| Maximum generated load (ton) | 6.0 | 5.8 |
| Maximum degree of deformation (mm) | 35 | 38 |
| Barrier Test | | |
| Maximum generated load (ton) | 7.2 | 9.0 |
| Maximum degree of deformation (mm) | 61 | 46 |
| Buckling state of the stopper | ○ | ○ |
| Total Evaluation | Optimum | Optimum |

E: Experiment

From the results of the experiment, it is understood that the large degree α of gradient which is formed at both ends of the curved portion can cause the maximum load in the barrier test to be greater, and the maximum degree of deformation to be smaller, resulting in sufficient shock resistance and an Optimum bumper beam.

Incidentally, it is to be understood that the present invention is not intended to be limited to the aforementioned embodiments, and the other structures capable of attaining the object of the present invention, such as variations or modifications set forth below, are included in the scope of the present invention.

More specifically, in the aforementioned embodiments, the curved portions 20 and 120 are structured to have the sectional configuration as shown in FIG. 2, but the sectional configuration of each curved portion 20 and 120 is arbitrary, such that the curved portion may include a part thereof which is parallel to the vehicle body 11 therefore as long as the curved portion is curved as a whole in the longitudinal direction, in other words, there is no serious disadvantage when the curved portions 20 and 120 are structured to have the hollow portion capable of obtaining the required the shock absorbing function.

The attachment portions 30 and 130 are not limited to the structure as described in the aforementioned embodiments, but may be arbitrarily structured as long as the attachment portion has the hollow portion and the solid portion, at least extending in the longitudinal direction of the curved portions 20 and 120, that is, the attachment portion can be structured as described below.

Figure 9:
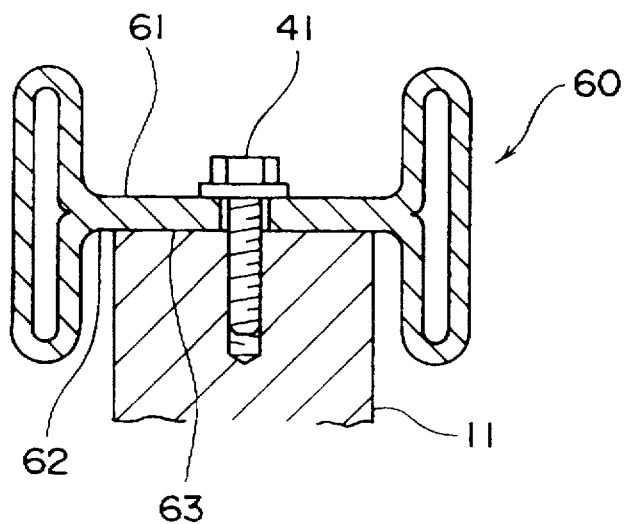
FIG. 9 is a sectional view showing a first modification according to the present invention.

For example, as shown in FIG. 9, concave portions 61 and 62 may be provided, respectively, on the outer side of the vehicle (the upper side of the drawing) and on the side of the bumper beam 10 that is facing the outer side of the vehicle body 11 (the lower side of the drawing), in which the concave portion 61 accommodates therein the head of the bolt 41 and the concave portion 62 may contain a connection face 63 in an attachment portion 60.

Figure 10:
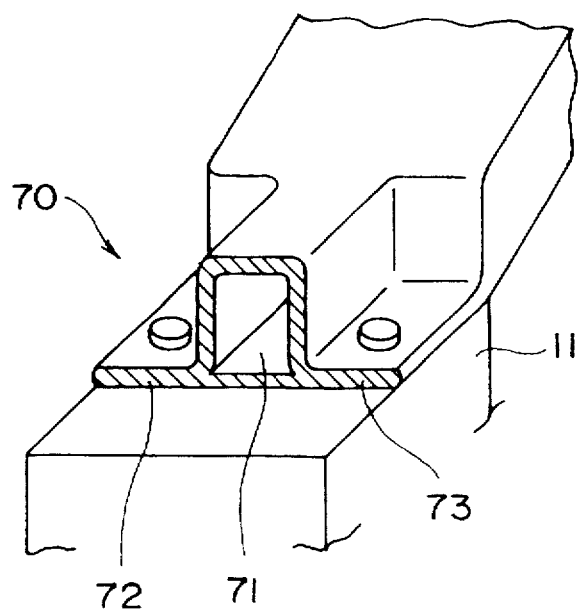
FIG. 10 is a perspective view showing a second modification according to the present invention.
Figure 11:
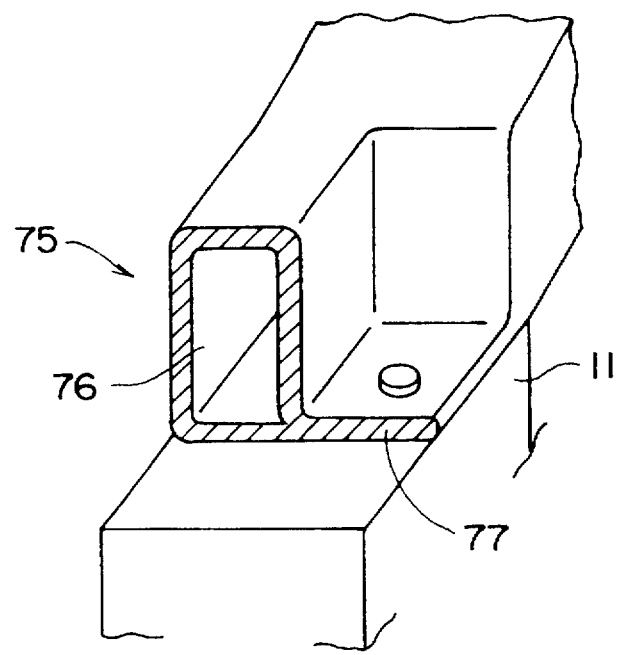
FIG. 11 is a perspective view showing a third modification according to the present invention.

Further, as shown in FIG. 10, an attachment portion 70 may be structured to have a hollow portion 71 at the central portion in a direction perpendicular to the longitudinal direction and solid portions 72 and 73 on both sides of the hollow portion 71, and, as shown in FIG. 11, at attachment portion 75 may be structured to have a hollow portion 76 on the right or left side of the attachment portion 75 in a direction perpendicular to the longitudinal direction and have a solid portion 77 on the other left or right side.

Figure 12:
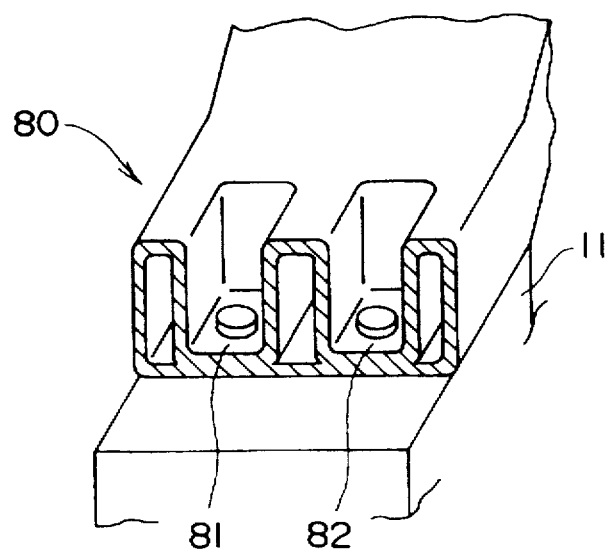
FIG. 12 is a perspective view showing a fourth modification according to the present invention.
Figure 13:
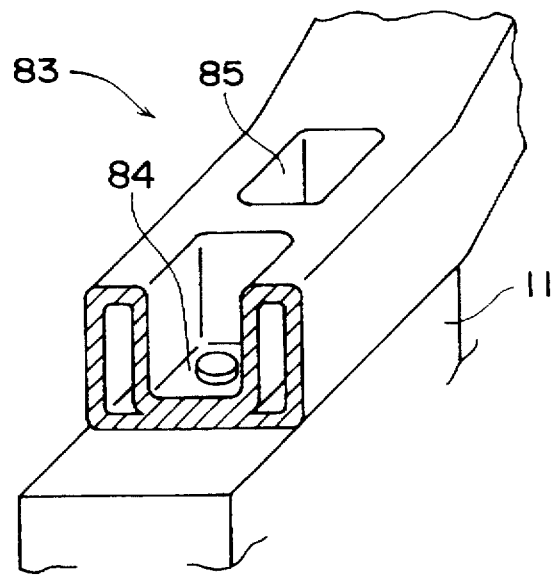
FIG. 13 is a perspective view showing a fifth modification according to the present invention.

Each attachment portion 30 and 130 has one concave portion 37 in the aforementioned embodiments, but it is possible for one attachment portion to be formed with multiple concave portions, for example, as shown in FIG. 12, an attachment portion 80 may be formed by placing multiple concave portions 81 and 82 in a direction line perpendicular to the longitudinal direction of the bumper beam 10, and, as shown in FIG. 13, an attachment portion 83 may be formed by placing multiple concave portions 84 and 85 in the same line of direction as the longitudinal direction of the bumper beam 10.

Figure 14:
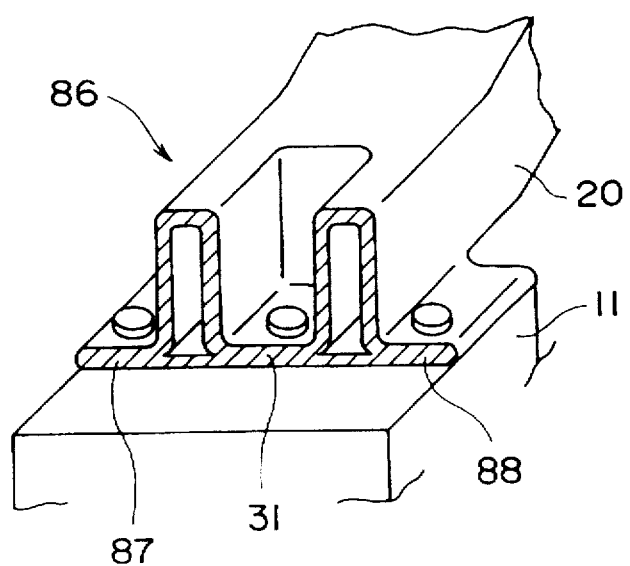
FIG. 14 is a perspective view showing a sixth modification according to the present invention.

In the aforementioned embodiments, the solid portion being formed in the attachment portions 30 and 130 is the only solid portion (the bottom portion 31) formed at the position extending from the curved portions 20 and 120, in the longitudinal direction of the curved portions 20 and 120, however, in the present invention, the other solid portions may be formed in the attachment portion, for example, as shown in FIG. 14, an attachment portion 86 may be structured to have solid portions 87 and 88, formed to project from the position extending from the curved portion 20, in the longitudinal direction from the curved portion 20 (the position where the curved portion 20 is extending in the longitudinal direction to maintain the width of the curved portion 20) to both sides in a direction perpendicular to the longitudinal direction of the curved portion 20, in addition to the solid portion (the bottom portion 31) formed at the position extending from the curved portion 20, in the longitudinal direction of the curved portion 20.

The portion, from the connecting portion 35 formed in the attachment portions 30 and 130 to the end of the bumper beam 10 (the opposite side of the concave portions 37 from the curved portion 20), is formed to be the hollow portion in the aforementioned embodiments, but may be formed to be the solid portion.

The attachment portions 30 and 130 are provided with the fitting projections (the stopping portions) 50, 151 and 152 in the aforementioned embodiments, but the provision of the fitting projections 50, 151 and 152 can be omitted. However, as seen from the aforementioned results of the experiments, it is advisable that the fitting projections 50, 151 and 152 be provided from the view of strength and the shock absorbing function.

And, the fitting projections 50, 151 and 152 are provided at the side of the curved portions 20 and 120 on the attachment portions 30 and 130 in the aforementioned embodiments, but, as shown in FIG. 15, the fitting projection may be formed as a fitting projection 89 provided at, approximately, the end of the attachment portion 30. The stopping portion is defined as the fitting projections 50, 151 and 152 in the aforementioned embodiments, but, in the present invention, the stopping portion may be formed as a concave portion, capable of accommodating the attachment portion, provided in the vehicle body.

In the aforementioned embodiments, the total number of bolts 41 being used is two, with one bolt for each of the two attachment portions 30, at the ends of the curved portion 20, and the two attachment portions 130, at the ends of the curved portion 120, but, more than a total of two bolts can be used for bolting. However, it is desirable that the number of bolts used be kept to a minimum in view of a reduction of the number of parts and of simplified work.

The bumper beams 10 and 110 are produced by blow molding in the aforementioned embodiments, however, the resin-made shock absorbing member for the vehicle of the present invention can be produced by other methods for molding as long as the molding method can ensure the requested configuration, such as gas injection molding method (a hollow injection molding method).

The resin-made shock absorbing member for the vehicle is explained as it applies to the bumper beams 10 and 110 in the aforementioned embodiments, however, the resin-made shock absorbing member for the vehicle can be applied to a bumper, a side protector and so on.

Industrial Availability

The present invention can be used as a general member capable of absorbing shock forces applied to the outer side of the vehicle by providing the vehicle with, for example, a bumper beam, a bumper, and/or a side protector.

The embodiments of the invention in which an exclusive property or privilege is claimed are defined as follows:

1. A blow-molded resin-made shock absorbing member for a vehicle, comprising:
    an elongate unitary body having first and second ends and an elongate curved and a first hollow portion contiguous with and oriented between said first and second ends, said curved and first hollow portion being arced in a first direction orthogonal to a lengthwise direction of said body;
    said first and second ends each including an attachment portion for facilitating a fixed connection of said body to a vehicle body, each said attachment portion including a second hollow portion contiguous with said first hollow portion and a solid third portion, said second and third portions both extending lengthwise of said attachment portion and said body; and
    a stopping portion integral with said elongate body and on each said attachment portion projecting in a second direction opposite said first direction each said stopping portion including a first surface facing in said lengthwise direction away from said curved and first hollow portion.

2. The blow-molded resin-made shock absorbing member according to claim 1, wherein said first surface on said stopping portion extends in a plane oriented transverse of said lengthwise direction.

3. The blow-molded resin-made shock absorbing member according to claim 2, wherein said first surface extends continuously laterally across a full width of said attachment portion.

4. The blow-molded resin-made shock absorbing member according to claim 3, wherein said stopping portion additionally includes plural laterally spaced stopping segments each having a second surface contiguous and coplanar with said first surface.

5. The blow-molded resin-made shock absorbing member according to claim 2, wherein each said stopping portion is oriented intermediate said third portion and said elongate curved and first hollow portion.

6. The blow-molded resin-made shock absorbing member according to claim 2, wherein each said stopping portion is oriented on a side of said third portion remote from said elongate curved and first hollow portion.

7. The blow-molded resin-made shock absorbing member according to claim 2, wherein a plane containing said first surface extends generally perpendicular to a plane containing said third portion.

8. The blow-molded resin-made shock absorbing member according to claim 1, wherein said second portion encircles said third portion so as to define sidewalls of a cavity opening outwardly in said first direction, said third portion forming a bottom wall of said cavity, said third portion on a side thereof remote from said cavity facing in a second direction opposite said first direction being flat and being adapted to interface with the vehicle body.

9. The blow-molded resin-made shock absorbing member according to claim 8, wherein an angle is provided between a segment of said curved and first hollow portion adjacent said attachment portion and said flat, said angle being one of 48° and 64°.

10. The blow-molded resin-made shock absorbing member according to claim 8, wherein said flat on said third portion transitions into a second surface at an edge thereof most remote to said curved and first hollow portion, said second surface being oriented at an acute angle to said flat and extends in said first direction relative to said flat.

11. The resin-made shock absorbing member according to claim 8, wherein said cavity portion has sufficient space to work a head of a bolt inserted through the bolt hole.

12. The resin-made shock absorbing member according to claim 11, wherein said second portion is formed to cause the head of the bolt to be accommodated in the cavity.

13. The blow-molded resin-made shock absorbing member according to claim 8, wherein said second portion encircles said third portion so as to define hollow sidewalls of said cavity.

14. The blow-molded resin-made shock absorbing member according to claim 8, wherein said second portion includes a pair of laterally spaced and lengthwise extending hollow sidewalls of said cavity and a pair of transverse extending hollow sidewalls.

15. The resin-made shock absorbing member according to claim 1, wherein said attachment portion is provided with a bolt hole passing through said third portion.

16. The blow-molded resin-made shock absorbing member according to claim 1, wherein each said stopping portion also includes a second surface thereon facing in said lengthwise direction toward said first surface so that a space exists between said first and second surfaces.

17. A combination of a blow-molded resin-made shock absorbing member and a vehicle, comprising:

an elongate unitary body having first and second ends and an elongate curved and a first hollow portion contiguous with and oriented between said first and second ends, said curved and first hollow portion being arced in a first direction orthogonal to a lengthwise direction of said body;

said first and second ends each including an attachment portion for facilitating a fixed connection of said body to a vehicle body;

a stopping portion integral with said elongate body and on each said attachment portion projecting in a second direction opposite said first direction, each said stopping portion including a surface facing in said lengthwise direction away from said curved and first hollow portion; and a pair of spaced surfaces on the vehicle body each opposing and interfacing with respective said stopping portions while simultaneously orienting said curved portion so that it arcs away from the vehicle body between the attachment portions, whereby an impact force applied to said curved portion in a direction toward the vehicle body causing said surfaces on respective said stopping portions to abut an opposing surface on the vehicle body to thereby facilitate an absorption of the impact force.

18. The blow-molded resin-made shock absorbing member according to claim 17, wherein each said attachment portion includes a second portion and a third portion, both extending lengthwise of said attachment portion and said body, said second portion encircling said third portion so as to define sidewalls of a cavity opening outwardly in said first direction, said third portion forming a bottom wall of said cavity.

* * * * *